US009740052B2

(12) United States Patent
Taniguchi et al.

(10) Patent No.: US 9,740,052 B2
(45) Date of Patent: Aug. 22, 2017

(54) DISPLAY DEVICE AND METHOD OF MANUFACTURING THE SAME

(71) Applicant: Japan Display Inc., Mobara-shi, Chiba-ken (JP)

(72) Inventors: Jiro Taniguchi, Hitachinaka (JP); Takahiro Nagami, Mobara (JP)

(73) Assignee: Japan Display Inc., Tokyo (JP)

( * ) Notice: Subject to any disclaimer, the term of this patent is extended or adjusted under 35 U.S.C. 154(b) by 199 days.

(21) Appl. No.: 13/659,945

(22) Filed: Oct. 25, 2012

(65) Prior Publication Data

US 2013/0100393 A1 Apr. 25, 2013

(30) Foreign Application Priority Data

Oct. 25, 2011 (JP) .................................. 2011-233832

(51) Int. Cl.
*G02F 1/1339* (2006.01)
*G02F 1/1333* (2006.01)

(52) U.S. Cl.
CPC ...... *G02F 1/1339* (2013.01); *G02F 1/133351* (2013.01)

(58) Field of Classification Search
CPC ............. G02F 1/13394; G02F 1/13392; G02F 2001/13398; G02F 1/133351; G02F 1/1339
USPC ................................................. 349/153–157
See application file for complete search history.

(56) References Cited

U.S. PATENT DOCUMENTS

| 7,956,537 | B2 | 6/2011 | Nakadaira | |
|---|---|---|---|---|
| 2008/0252839 | A1* | 10/2008 | Nakadaira | ........... H01L 51/5237 349/153 |
| 2009/0066903 | A1* | 3/2009 | Yoshida | ................ G02F 1/1339 349/153 |

(Continued)

FOREIGN PATENT DOCUMENTS

| CN | 101427292 A | 5/2009 |
|---|---|---|
| CN | 101842742 A | 9/2010 |

(Continued)

OTHER PUBLICATIONS

Office Action issued by SIPO dated Nov. 4, 2014 of corresponding Chinese application No. 201210398625.9.

(Continued)

*Primary Examiner* — Paisley L Arendt
*Assistant Examiner* — Agnes Dobrowolski
(74) *Attorney, Agent, or Firm* — Typha IP LLC

(57) ABSTRACT

Between a pair of mother substrates, spaces are defined by a seal. The pair of mother substrates is cut to cut out cells. The seal is arranged to fill a region between adjacent spaces. On the seal, a low moisture-permeable layer made of a material that is harder and has lower moisture permeability than the seal is laminated in the region between the adjacent spaces. On at least one of the pair of mother substrates, a pair of projecting stripe portions extending along a length of the seal and arranged at an interval is formed in the region between the adjacent spaces at a position overlapping with the seal and the low moisture-permeable layer. In a step of cutting the pair of mother substrates, together with the pair of mother substrates, the seal and the low moisture-permeable layer are cut between the pair of projecting stripe portions.

9 Claims, 4 Drawing Sheets

(56) References Cited

U.S. PATENT DOCUMENTS

| | | | |
|---|---|---|---|
| 2010/0097560 A1* | 4/2010 | Ikeguchi | G02F 1/1339 349/155 |
| 2011/0075090 A1 | 3/2011 | Shigekura et al. | |

FOREIGN PATENT DOCUMENTS

| | | |
|---|---|---|
| JP | H05-072540 A | 3/1993 |
| JP | 2006-30439 A | 2/2006 |
| JP | 2008-262796 A | 10/2008 |
| JP | 2008-309863 A | 12/2008 |
| JP | 2011-033688 A | 2/2011 |
| JP | 2011-75623 | 4/2011 |
| KR | 10-2008-0092848 | 10/2008 |

OTHER PUBLICATIONS

Office Action issued by IPO dated Dec. 18, 2014 of corresponding Taiwanese application No. 101139172.
Office Action dated Jul. 28, 2015 regarding a counterpart Japanese patent application No. 2011-233832.

\* cited by examiner

DISPLAY DEVICE AND METHOD OF MANUFACTURING THE SAME

CROSS-REFERENCE TO RELATED APPLICATION

The present application claims priority from Japanese application JP 2011-233832 filed on Oct. 25, 2011 the content of which is hereby incorporated by reference into this application.

BACKGROUND OF THE INVENTION

1. Field of the Invention

The present invention relates to a display device and a method of manufacturing the same.

2. Description of the Related Art

As a method of manufacturing a display panel, there is known a method of cutting out individual display panels from large-sized mother glass substrates. A liquid crystal display panel has a structure in which liquid crystal is sealed by a seal between a pair of substrates. Therefore, by cutting the mother glass substrates while avoiding the seal, the mother glass substrates are prevented from being broken due to cutting force dispersion.

In recent years, there has been a demand for narrowing an outer region (frame) of a display region of the display panel, and proposals of cutting the mother glass substrates together with the seal have been made (Japanese Patent Application Laid-open No. 2011-75623).

Japanese Patent Application Laid-open No. 2011-75623 discloses a method of preventing the cutting force dispersion by arranging a hard material on the seal along the cutting line. However, no consideration is made of reducing moisture intrusion from the cut seal.

SUMMARY OF THE INVENTION

The present invention has an object of reducing moisture intrusion from a seal.

(1) A display device according to an exemplary embodiment of the present invention includes: a pair of substrates arranged at an interval; a seal for defining a space between the pair of substrates; an element arranged in the space, for displaying an image; a low moisture-permeable layer arranged so as to be laminated on the seal and made of a material having lower moisture permeability than the seal; and a projecting stripe portion provided on at least one of the pair of substrates, the projecting stripe portion extending along a length of the seal and being formed at a position overlapping with the seal and the low moisture-permeable layer. According to the exemplary embodiment of the present invention, the projecting stripe portion is present, and hence the seal can be thinned. With this, it is possible to reduce the moisture intrusion from the seal due to the moisture permeability of the seal. Further, the low moisture-permeable layer is present as well, and hence the seal can be thinned similarly. Thus, it is possible to reduce the moisture intrusion from the seal due to the moisture permeability of the seal.

(2) In the display device according to item (1), end surfaces of the seal and the low moisture-permeable layer may be exposed between the pair of substrates.

(3) In the display device according to item (1) or (2), one of the pair of substrates may be a color filter substrate in which a color filter is formed, another of the pair of substrates may be a TFT substrate in which a thin film transistor is formed, and the projecting stripe portion may include a layer formed of the same material and at the same thickness as apart of the color filter on the color filter substrate.

(4) In the display device according to item (3), the low moisture-permeable layer may be provided on the color filter substrate so as to cover the projecting stripe portion, and the seal may be arranged between the low moisture-permeable layer and the TFT substrate.

(5) A method of manufacturing a display device according to another exemplary embodiment of the present invention includes: defining, by a seal, a plurality of spaces for arranging an element for displaying an image between a pair of mother substrates; and cutting the pair of mother substrates to cut out a plurality of cells, in which: the seal is arranged to fill a region between adjacent two of the plurality of spaces; on the seal, a low moisture-permeable layer made of a material that is harder and has lower moisture permeability than the seal is laminated in the region between the adjacent two of the plurality of spaces; on at least one of the pair of mother substrates, a pair of projecting stripe portions extending along a length of the seal and arranged at an interval is formed in the region between the adjacent two of the plurality of spaces at a position overlapping with the seal and the low moisture-permeable layer; and the cutting the pair of mother substrates includes cutting, together with the pair of mother substrates, the seal and the low moisture-permeable layer, the cutting being carried out between the pair of projecting stripe portions. According to the another exemplary embodiment of the present invention, the pair of projecting stripe portions is formed, and hence the seal can be thinned. With this, it is possible to reduce the moisture intrusion from the seal due to the moisture permeability of the seal. Further, the low moisture-permeable layer is present as well, and hence the seal can be thinned similarly. Thus, it is possible to reduce the moisture intrusion from the seal due to the moisture permeability of the seal. Further, not only the seal but also the low moisture-permeable layer is cut, and thus the cutting surface of the low moisture-permeable layer is exposed. Therefore, the exposed surface of the seal can be reduced. Also from this point, it is possible to reduce the moisture intrusion from the seal.

(6) In the method of manufacturing a display device according to item (5), one of the pair of mother substrates may be a color filter substrate in which a color filter is formed, another of the pair of mother substrates may be a TFT substrate in which a thin film transistor is formed, and the pair of projecting stripe portions may include a layer formed of the same material and at the same thickness as a part of the color filter on the color filter substrate.

(7) In the method of manufacturing a display device according to item (6), the low moisture-permeable layer may be provided on the color filter substrate so as to cover the pair of projecting stripe portions, and the seal may be arranged between the low moisture-permeable layer and the TFT substrate.

DETAILED DESCRIPTION OF THE INVENTION

In the following, an embodiment of the present invention is described with reference to the drawings.

Figure 1:
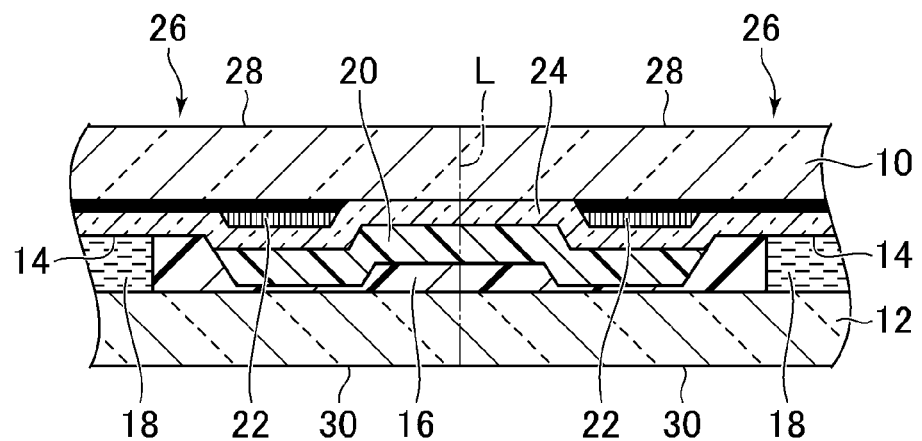
FIG. 1 is a view illustrating a method of manufacturing a display device according to an embodiment of the present invention, showing a cross-section along the I-I line shown in FIGS. 2 to 4.

FIG. 1 is a view illustrating a method of manufacturing a display device according to the embodiment of the present invention. The display device manufactured in this embodiment is a liquid crystal display device, but the present invention is applicable to other display devices such as an organic electroluminescence device.

In this embodiment, a pair of mother substrates 10 and 12 is prepared. FIG. 1 illustrates a cross-section of the pair of mother substrates 10 and 12. The mother substrate 10 is a color filter substrate in which a color filter is formed. Specifically, the mother substrate 10 includes a plurality of integrated color filter substrates as components of a plurality of display devices, and is cut into a plurality of individual pieces in the subsequent step. The mother substrate 10 is made of a light-permeable material such as glass. The mother substrate 10 includes colored layers (color filters) and a black matrix (both not shown).

The mother substrate 12 is a TFT substrate in which thin film transistors, electrodes, and wiring (all not shown) are formed. The mother substrate 12 includes a plurality of integrated TFT substrates as components of the plurality of display devices, and is cut into a plurality of pieces in the subsequent step.

Between the pair of mother substrates 10 and 12, a seal 16 is provided to define a plurality of spaces 14 for arranging an element for displaying an image. Each of the plurality of spaces 14 is a component of the individual display device. Examples of the element provided for displaying an image include an element for controlling passing and blocking of light (liquid crystal material 18 in the example of FIG. 1). Alternatively, the elements for displaying an image may be an organic electroluminescence element.

Figure 2:
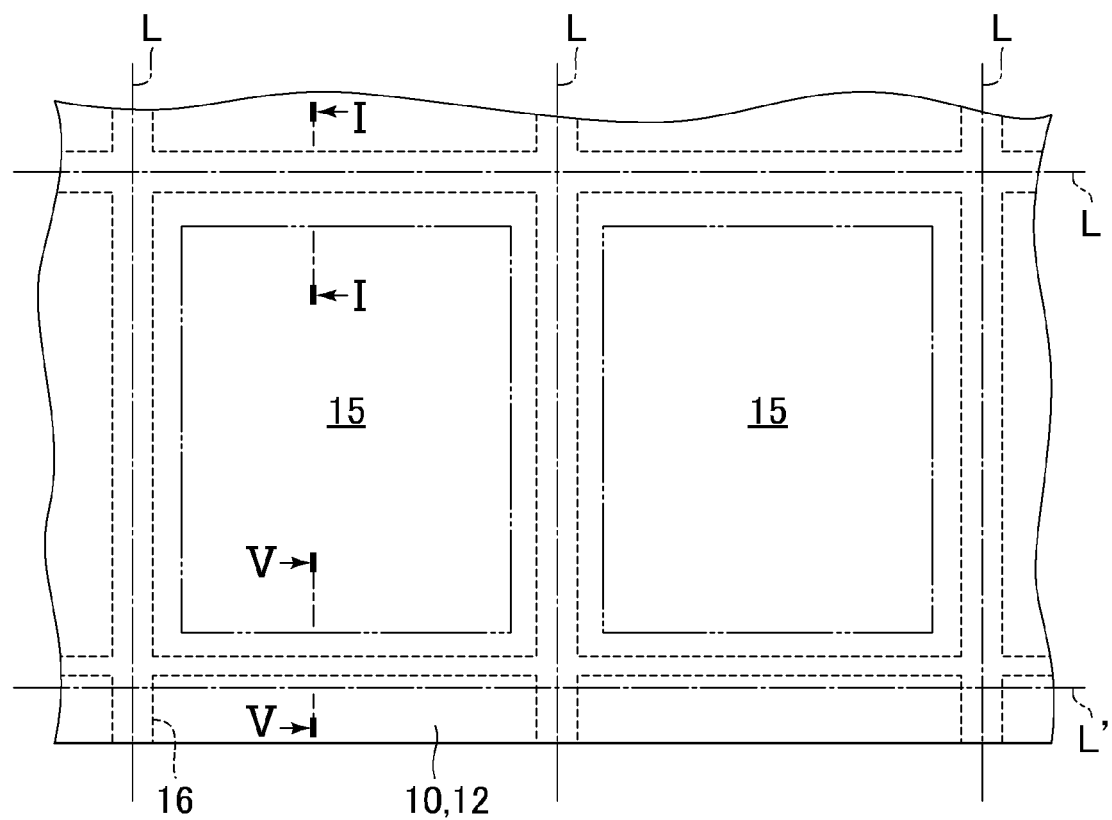
FIG. 2 is a plan view of a pair of mother substrates, in which a seal is indicated by broken lines.

FIG. 2 is a plan view of the pair of mother substrates 10 and 12, in which the seal 16 is indicated by broken lines. The seal 16 is arranged so as to fill a region between adjacent spaces 14. A display region 15 at which the image is displayed is present in a manner opposed to each space 14. The seal 16 is made of a material having moisture permeability such as a resin. This embodiment is an example in which the liquid crystal material 18 is sealed by the seal 16 between the pair of opposed mother substrates 10 and 12. As a modified example, the space 14 defined by the seal 16 may be empty. In this case, an injection port (not shown) is formed in advance in the seal 16, and the liquid crystal material 18 is injected in the subsequent step. The injection port is sealed by a sealing material.

Figure 3:
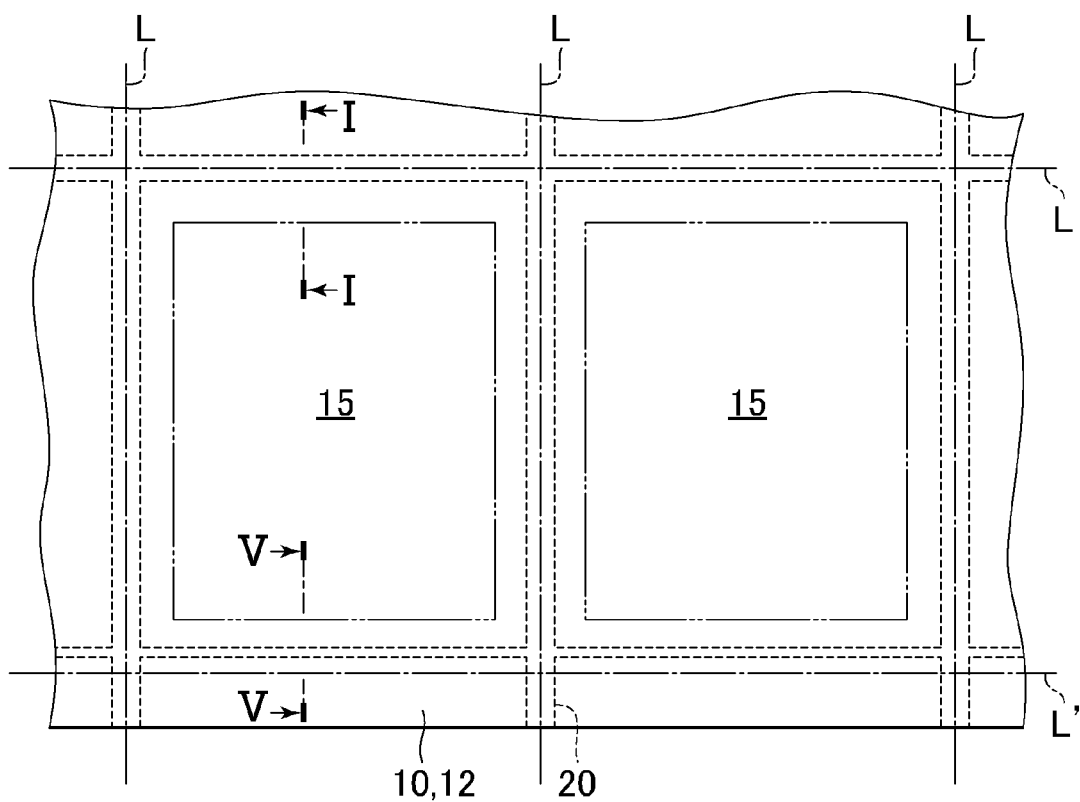
FIG. 3 is a plan view of the pair of mother substrates, in which a low moisture-permeable layer is indicated by broken lines.

On the seal 16 in the region between the adjacent spaces 14, a low moisture-permeable layer 20 made of a material harder and having lower moisture permeability than the seal 16 is laminated. FIG. 3 is a plan view of the pair of mother substrates 10 and 12, in which the low moisture-permeable layer 20 is indicated by broken lines. The low moisture-permeable layer 20 may be formed of the same material and in the same process as a spacer (not shown) for maintaining an interval between the pair of mother substrates 10 and 12 in the space 14 defined by the seal 16. The seal 16 is arranged between the low moisture-permeable layer 20 and the mother substrate 12. As illustrated in FIG. 1, the seal 16 has a width (width in a direction between the adjacent spaces 14) larger than that of the low moisture-permeable layer 20. Therefore, the low moisture-permeable layer 20 is not exposed to the space 14 in which the liquid crystal material 18 is injected. Note that, the low moisture-permeable layer 20 is made of a material harder than the seal 16.

Figure 4:
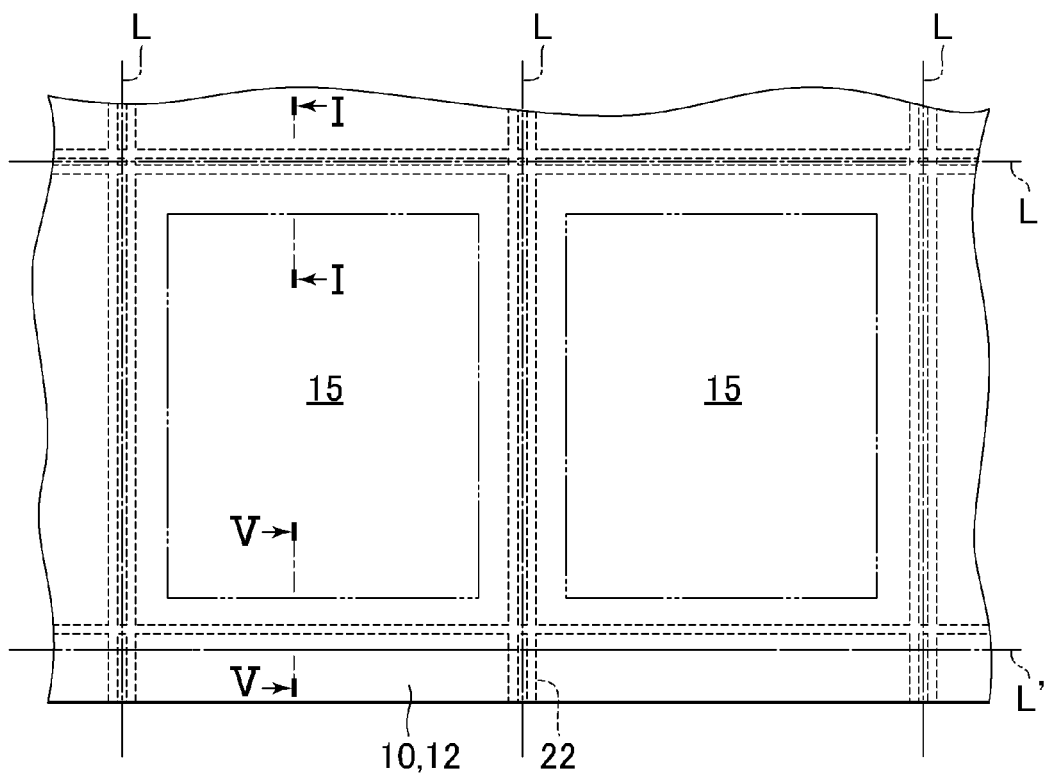
FIG. 4 is a plan view of the pair of mother substrates, in which projecting stripe portions are indicated by broken lines.

On at least one of the pair of mother substrates 10 and 12 (mother substrate 10 in the example of FIG. 1), a pair of projecting stripe portions 22 is formed. FIG. 4 is a plan view of the pair of mother substrates 10 and 12, in which the projecting stripe portions 22 are indicated by broken lines. The pair of projecting stripe portions 22 is arranged in the region between the adjacent spaces 14 at an interval and extends along the length of the seal 16. The pair of projecting stripe portions 22 is located at a position overlapping with the seal 16 and the low moisture-permeable layer 20. As illustrated in FIG. 1, the entire projecting stripe portion 22 overlaps with the low moisture-permeable layer 20. Note that, a part of the low moisture-permeable layer 20 (part to be cut) does not overlap with the projecting stripe portion 22.

The pair of projecting stripe portions 22 includes a layer which is formed of the same material and at the same thickness as a part of the color filter (not shown) on the mother substrate 10 (color filter substrate). Therefore, the projecting stripe portion 22 is colored. The projecting stripe portion 22 may be covered with a light-permeable layer 24, but in this case, the surface of the light-permeable layer 24 includes a portion projected along the shape of the projecting stripe portion 22. The low moisture-permeable layer 20 is provided to the mother substrate 10 (color filter substrate) so as to cover the projecting stripe portion 22.

In this embodiment, the pair of mother substrates 10 and 12 is cut along the cutting lines L and L', and thus a plurality of cells 26 are cut out. Specifically, together with the pair of mother substrates 10 and 12, the seal 16 and the low moisture-permeable layer 20 are cut between the pair of projecting stripe portions 22. In the cutting process, the projecting stripe portion 22 is not cut. In this manner, individual display devices are cut out.

Figure 5:
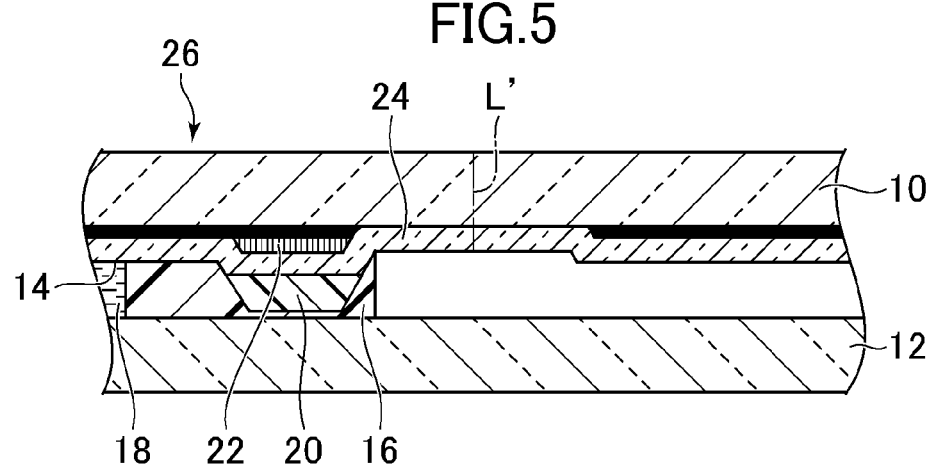
FIG. 5 is a view illustrating a structure of a position at which only one of the mother substrates is cut, showing a cross-section along the V-V line shown in FIGS. 2 to 4.

Note that, FIG. 5 illustrates a structure of a position at which only the mother substrate 10 is cut so that the TFT substrate is projected from the color filter substrate for electrical connection to the outside in the individual display devices. That is, on only one side (left side in FIG. 5) of both sides across the cutting line L', the seal 16, the low moisture-permeable layer 20, and the projecting stripe portion 22 are laminated and the liquid crystal material 18 is sealed, and on another side (right side in FIG. 5) thereof, none of those members is provided between the pair of mother substrates 10 and 12. At the part having this structure, the mother substrate 10 is cut along the cutting line L', but the mother substrate 12 is not cut. In this manner, the structure in which the TFT substrate is projected from the color filter substrate can be obtained.

In this embodiment, by forming the projecting stripe portion 22, the seal 16 can be thinned. By thinning the seal 16, the moisture intrusion from the seal 16 due to the moisture permeability of the seal 16 can be reduced. Further, the low moisture-permeable layer 20 is present as well, and hence, similarly, the seal 16 can be thinned and the moisture intrusion from the seal 16 due to the moisture permeability of the seal 16 can be reduced. Still further, not only the seal 16 but also the low moisture-permeable layer 20 is cut, and thus the cutting surface of the low moisture-permeable layer 20 is exposed. Therefore, the exposed surface of the seal 16 can be reduced. Also from this point, the moisture intrusion from the seal 16 can be reduced.

Figure 6:
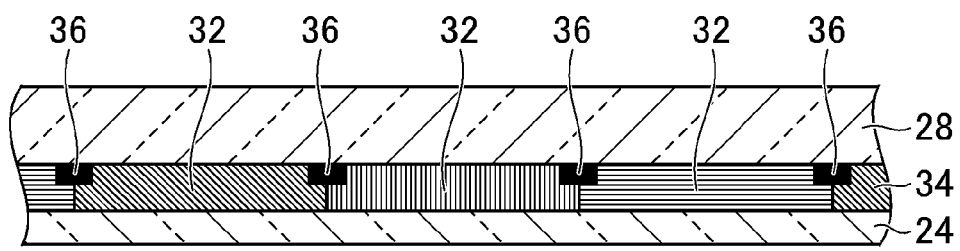
FIG. 6 is a sectional view of a color filter substrate.

The display device obtained by the above-mentioned manufacturing method includes a pair of substrates 28 and 30 arranged at an interval. As illustrated in FIG. 6, the substrate 28 is a color filter substrate in which a color filter is formed. In the substrate 28, a color filter 34 including colored layers 32 of a plurality of colors, and a black matrix 36 are formed.

Figure 7:
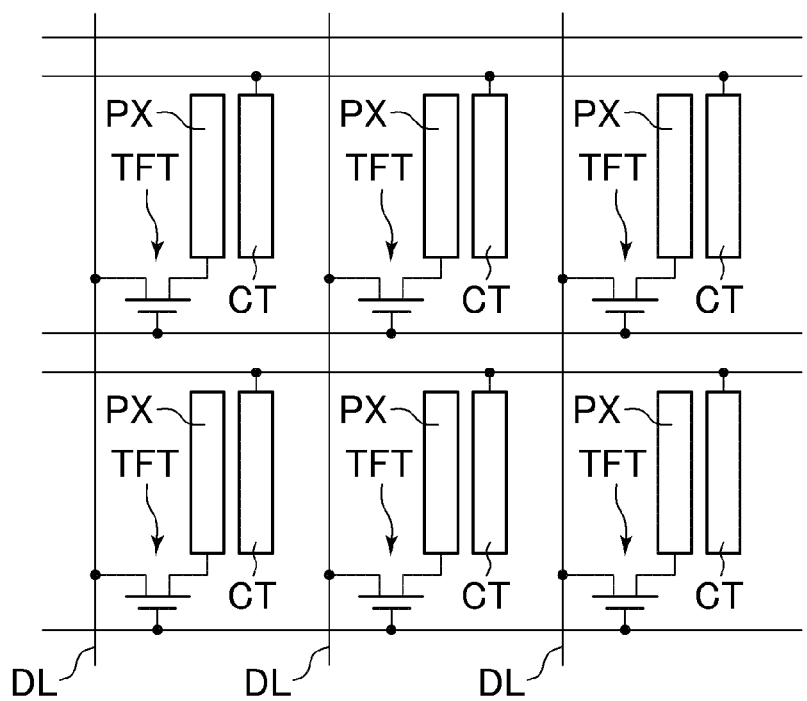
FIG. 7 is a diagram illustrating a circuit formed on a TFT substrate.

The substrate 30 is a TFT substrate in which thin film transistors are formed. FIG. 7 is a diagram illustrating a circuit formed on the substrate 30. The circuit includes a common electrode CT and a pixel electrode PX. A signal to be input to the pixel electrode PX is controlled by a thin film transistor TFT. A signal from a signal line DL is input to the pixel electrode PX.

As illustrated in FIG. 1, the seal 16 defines the space 14 between the pair of substrates 28 and 30. In the space 14 defined by the seal 16, an element (for example, liquid crystal material 18) for displaying an image is arranged. The low moisture-permeable layer 20 made of a material having lower moisture permeability than the seal 16 is arranged so as to be laminated on the seal 16. The seal 16 is arranged between the low moisture-permeable layer 20 and the substrate 30. Between the pair of substrates 28 and 30, the integrated seal 16 and low moisture-permeable layer 20 are cut so that end surfaces thereof are exposed.

On at least one of the pair of substrates 28 and 30, the projecting stripe portion 22 extending along the length of the seal 16 is formed at a position overlapping with the seal 16 and the low moisture-permeable layer 20. The projecting stripe portion 22 includes a layer formed of the same material and at the same thickness as a part of the color filter on the color filter substrate. The low moisture-permeable layer 20 is provided on the color filter substrate so as to cover the projecting stripe portion 22. Other configurations include contents that are apparent from the description of the manufacturing method above.

According to this embodiment, the projecting stripe portion 22 is present, and thus the seal 16 can be thinned. With this, it is possible to reduce moisture intrusion from the seal 16 due to the moisture permeability of the seal 16. Further, the low moisture-permeable layer 20 is present as well, and thus, similarly, the seal 16 can be thinned and the moisture intrusion from the seal 16 due to the moisture permeability of the seal 16 can be reduced.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A display device, comprising:
a pair of substrates arranged at an interval;
a seal for defining a space between the pair of substrates;
an element arranged in the space, for displaying an image;
a low moisture-permeable layer in contact with and laminated on the seal and made of a material having lower moisture permeability than the seal;
a pair of projecting stripe portions provided on at least one of the pair of substrates, the projecting stripe portions extending along a length of the seal and overlapping with the seal and the low moisture-permeable layer in a direction of the interval between the pair of substrates; and
a light-permeable layer between the pair of projecting stripe portions and the low-moisture-permeable layer, wherein
each of the pair of projecting stripe portions, the light-permeable layer, the low moisture-permeable layer, and the seal overlap with one another in a plan view along the direction of the interval between the pair of substrates,
each of the seal and the low moisture-permeable layer is continuously provided, from a first area overlapping with the pair of projecting stripe portions, to a second area protruding from the pair of projecting stripe portions,
the low moisture-permeable layer has a projection shape defined along a surface of the pair of projecting stripe portions, the projection shape overlapping with an area between the pair of projecting stripe portions in the plan view, the projection shape being larger than each of the pair of projecting stripe portions.

2. The display device according to claim 1, wherein the seal and the low moisture-permeable layer are in direct contact with each other.

3. The display device according to claim 2,
wherein one of the pair of substrates comprises a color filter substrate in which a color filter is formed,
wherein another of the pair of substrates comprises a TFT substrate in which a thin film transistor is formed, and
wherein each of the pair of projecting stripe portions comprises a layer formed of the same material and at the same thickness as a part of the color filter on the color filter substrate.

4. The display device according to claim 3,
wherein the low moisture-permeable layer is provided on the color filter substrate so as to cover the pair of projecting stripe portions, and
wherein the seal is arranged between the low moisture-permeable layer and the TFT substrate.

5. The display device according to claim 1,
wherein each of the pair of projecting stripe portions is colored and is formed at a position between the space in which the element is arranged and exposed end surfaces of the seal and the low moisture permeable layer in the plan view.

6. A method of manufacturing a display device, comprising:
defining, by a seal, a plurality of spaces for arranging an element for displaying an image between a pair of mother substrates arranged at an interval; and
cutting the pair of mother substrates to cut out a plurality of cells,
wherein the seal is arranged to fill a region between adjacent two of the plurality of spaces,
wherein on the seal, a low moisture-permeable layer made of a material that is harder and has lower moisture permeability than the seal is laminated in the region between the adjacent two of the plurality of spaces,
wherein, on at least one of the pair of mother substrates, a pair of projecting stripe portions extending along a length of the seal and arranged at an interval is formed in the region between the adjacent two of the plurality of spaces so as to overlap with the seal and the low moisture-permeable layer in a direction of the interval between the pair of substrates, wherein a light-permeable layer is provided between the pair of projecting stripe portions and the low moisture-permeable layer, wherein each of the pair of projecting stripe portions, the light-permeable layer, the low moisture-permeable layer, and the seal overlap with one another in a plan view along the direction of the interval between the pair of substrates, wherein each of the seal and the low moisture-permeable layer is continuously provided, from a first area overlapping with the pair of projecting stripe portions, to a second area protruding from the pair of projecting stripe portions, wherein the low moisture-permeable layer has a projection shape defined along a surface of the pair of projecting stripe portions, the projection shape overlapping with an area between the pair of projecting stripe portions in the plan view, the projection shape being larger than each of the pair of projecting stripe portions, and wherein the cutting the pair of mother substrates comprises cutting, together with the pair of mother substrates, the seal and the low moisture-permeable layer, the cutting being carried out between the pair of projecting stripe portions.

7. The method of manufacturing a display device according to claim 6, wherein one of the pair of mother substrates comprises a color filter substrate in which a color filter is formed, wherein another of the pair of mother substrates comprises a TFT substrate in which a thin film transistor is formed, and wherein the pair of projecting stripe portions comprises a layer formed of the same material and at the same thickness as a part of the color filter on the color filter substrate.

8. The method of manufacturing a display device according to claim 7, wherein the low moisture-permeable layer is provided on the color filter substrate so as to cover the pair of projecting stripe portions, and wherein the seal is arranged between the low moisture-permeable layer and the TFT substrate.

9. The method of manufacturing a display device according to claim 7, wherein the seal and the low moisture-permeable layer are in direct contact with each other.

* * * * *